(12) United States Patent
Darnell et al.

(10) Patent No.: US 9,399,396 B2
(45) Date of Patent: Jul. 26, 2016

(54) ADAPTIVE CONTROL OF MOTOR VEHICLE POWERTRAIN

(71) Applicant: Jaguar Land Rover Limited, Whitley Coventry Warwickshire (GB)

(72) Inventors: Paul Darnell, Royal Leamington Spa (GB); Elliot Hemes, Solihull (GB); Stephen Stacey, Notts (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/374,378

(22) PCT Filed: Jan. 25, 2013

(86) PCT No.: PCT/EP2013/051440
§ 371 (c)(1),
(2) Date: Jul. 24, 2014

(87) PCT Pub. No.: WO2013/110759
PCT Pub. Date: Aug. 1, 2013

(65) Prior Publication Data
US 2014/0372005 A1 Dec. 18, 2014

(30) Foreign Application Priority Data
Jan. 25, 2012 (GB) .................................. 1201201.9

(51) Int. Cl.
*B60W 20/00* (2016.01)
*B60W 10/04* (2006.01)
(Continued)

(52) U.S. Cl.
CPC ................. *B60K 26/02* (2013.01); *B60K 26/04* (2013.01); *B60W 10/04* (2013.01); *B60W 10/06* (2013.01); *B60W 30/188* (2013.01); *B60W 50/082* (2013.01); *F02D 11/105* (2013.01); *F02D 41/2422* (2013.01); *B60K 2026/046* (2013.01); *B60W 2050/0096* (2013.01); *B60W 2510/0661* (2013.01); *B60W 2540/10* (2013.01); *B60W2540/106* (2013.01); *B60W 2710/105* (2013.01); *F02D 2041/1432* (2013.01); *F02D 2200/702* (2013.01)

(58) Field of Classification Search
USPC ......... 701/22, 102; 903/930, 947, 951; 477/2, 477/4
See application file for complete search history.

(56) References Cited

U.S. PATENT DOCUMENTS 5,265,570 A 11/1993 Schnaibel et al.
5,961,420 A * 10/1999 Darnell ............... F16H 61/0213
477/115

(Continued)

FOREIGN PATENT DOCUMENTS

DE 19628655 C1 1/1998
DE 102007053319 A1 5/2008
(Continued)

OTHER PUBLICATIONS

International Search Report for application No. PCT/EP2013/051440, dated Nov. 11, 2013, 4 pages.
(Continued)

*Primary Examiner* — Adam Tissot
(74) *Attorney, Agent, or Firm* — Reising Ethington P.C.

(57) ABSTRACT

A method and system is disclosed for blending between different torque maps of a vehicle so that step changes of torque output are avoided as accelerator pedal position is changed. The invention provides different blending rates so as to reduce the blending time if driver demand is in the direction of torque change.

24 Claims, 4 Drawing Sheets

(51) Int. Cl.
  *F02D 17/02* (2006.01)
  *B60K 26/02* (2006.01)
  *B60W 10/06* (2006.01)
  *B60W 50/08* (2012.01)
  *B60K 26/04* (2006.01)
  *F02D 11/10* (2006.01)
  *F02D 41/24* (2006.01)
  *B60W 30/188* (2012.01)
  *B60W 50/00* (2006.01)
  *F02D 41/14* (2006.01)

(56) References Cited

U.S. PATENT DOCUMENTS

| | | |
|---|---|---|
| 2006/0035749 A1 | 2/2006 | Kanafani et al. |
| 2008/0114521 A1* | 5/2008 | Doering .............. B60W 30/16 701/96 |
| 2008/0300768 A1 | 12/2008 | Hijikata |
| 2009/0192014 A1 | 7/2009 | Tiwari et al. |
| 2011/0032075 A1 | 2/2011 | Alrabady et al. |

FOREIGN PATENT DOCUMENTS

| | | |
|---|---|---|
| FR | 2962096 A1 | 1/2012 |
| JP | H09147294 A | 6/1997 |
| JP | 2008168866 A | 7/2008 |
| WO | WO03076834 A1 | 9/2003 |

OTHER PUBLICATIONS

Great Britain Search Report for application No. GB1201201.9, dated May 24, 2012, 5 pages.

English translation of Japanese Office action corresponding to application No. 2014-553730, dated Sep. 1, 2015, 2 pages.

\* cited by examiner

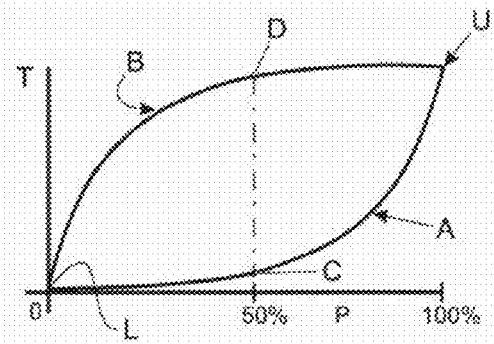
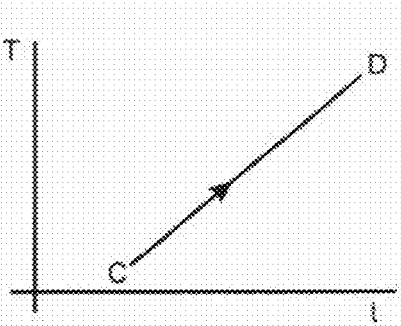
FIGURE 2
PRIOR ART
FIGURE 3
PRIOR ART
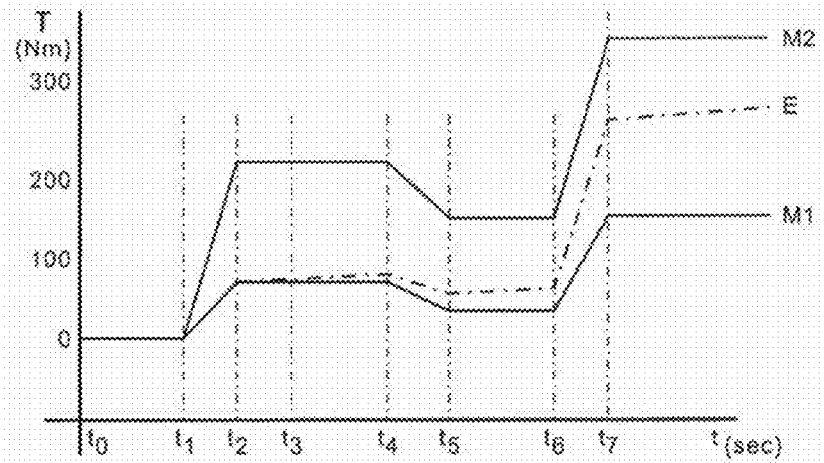
FIGURE 5
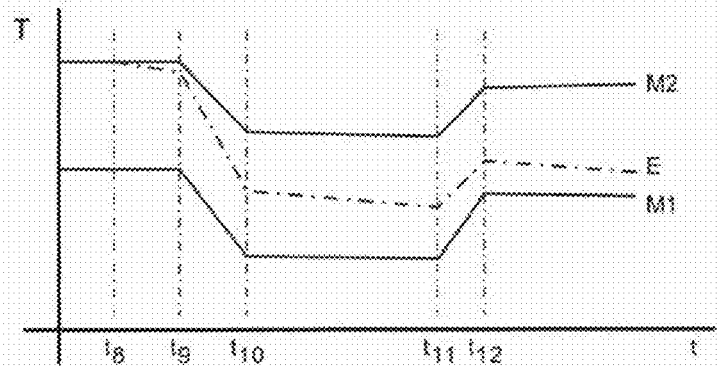
FIGURE 6

ADAPTIVE CONTROL OF MOTOR VEHICLE POWERTRAIN

FIELD OF THE INVENTION

Embodiments of the present invention relate to adaptive control of a powertrain of a motor vehicle, in particular, embodiments of the present invention relate to adaptive control of a source of motive power, for example an internal combustion engine and in particular, but not exclusively, to the response of the engine to an operator command in consequence of a change of engine operating mode. The change of engine operating mode may in turn be related to a change of operating mode of a vehicle in which the engine is installed. Aspects of the invention relate to a method, to a system and to a vehicle.

BACKGROUND

Internal combustion engines of vehicles may have operating modes which may be selectable by the driver. Thus in some vehicles an economy mode, a normal mode and a sport mode may be provided, each mode having a different engine response to one or more commands of the driver. Typically the engine may respond differently in each mode to a given input of the accelerator pedal, being least responsive in economy mode, and most responsive in sport made. In this way driveability of the vehicle can be improved by providing a range of accelerator pedal movement which is appropriate to, for example, the output torque characteristic of the engine. Such a system necessarily relies upon an electronic input from the vehicle driver, for example an accelerator potentiometer providing an input signal to an electronic control unit having a plurality of accelerator pedal position/output torque maps. The maps may also be referred to as or accelerator pedal progression maps.

Another kind of operating mode relates to the terrain which a vehicle is intended to cross. U.S. Pat. No. 7,349,776, the content of which is hereby incorporated by reference, describes a vehicle control system in which the driver can implement improved control over a broad range of driving conditions, and in particular over a number of different terrains which may be encountered when driving off-road, in response to a driver input command relating to the terrain, the vehicle control system is selected to operate in one of a number of different driving modes including one or more terrain response (TR) modes. For each TR mode, the various vehicle subsystems are operated in a manner appropriate to the corresponding terrain.

In one arrangement, a mode (for example a winter mode) is available in which the vehicle is configured to launch from standstill in a forward gear other than first gear such as a second gear to reduce risk of excessive wheel slip. Different modes may have different accelerator pedal position/output torque maps, torque delivery (accelerator pedal position/output torque maps in combination with a rate at which engagement of transmission clutches is controlled to take place thereby determining how aggressively gear shifts take place), and transmission shift points as a function of coefficient of surface friction. For example, in one or more TR modes the transmission shift points may be arranged wherein gear shifts take place at lower speeds than they might otherwise take place at, and in a more gentle manner (e.g. at a slower rate).

When a driver selects an appropriate terrain response mode, a vehicle control unit (VCU) selects a corresponding one or more accelerator/torque maps, for example when driving in rocky terrain, a mode appropriate to travel over such terrain may be selected in which the accelerator pedal/output torque map generates a high torque output for a small accelerator movement, thus giving immediate urge to overcome a rock step. In contrast on sand, a low torque output may be indicated for the same accelerator movement, so as to avoid spinning the vehicle wheels and digging a hole. To some extent the selected terrain response mode (and therefore torque map) may foe a matter of judgement by a user related for example to the available grip of one or more wheels of the vehicle on the terrain.

Any two torque maps associated with different respective vehicle operating modes coincide at zero accelerator position/zero torque and maximum accelerator position/maximum torque. In between these conditions, if the map being used to determine engine output torque as a function of accelerator pedal position changes, an immediate change of engine output, torque may occur.

If an alternative operating mode is selected by the vehicle driver, a change in the characteristic of engine response is generally not a surprise—the change is in fact expected by the driver and is generally desirable. However difficulties may arise if the operating mode is automatically selected in response to a vehicle sensing a change of operating condition. Thus, for example a vehicle may detect a change of terrain from rock to sand and, whilst the accelerator is partly applied, command the vehicle engine to adopt a different torque map. The consequent change in engine response may be disconcerting to the driver, especially if such automatic mode changes are repeated frequently. They may foe particularly disconcerting to the vehicle driver it the accelerator is not being moved at the time of change.

FIG. 1 shows a known motor vehicle 101 having a powertrain 101P. The powertrain 101P includes an engine 121, a transmission 124, a power take-off unit (PTU) 137, a rear driveshaft or propshaft 131R and a front driveshaft or propshaft 131F. The rear driveshaft 131R is operable to drive a pair of rear wheels 113, 114 via a rear differential 135R whilst the front driveshaft 131F is operable to drive a pair of front wheels 111, 112 via a front differential 135F.

The vehicle 101 has an engine controller 121C arranged to receive an accelerator pedal position signal from an accelerator pedal 161 and a brakes controller 141C operable to receive a brake pedal position signal from a brake pedal 163.

In the configuration of FIG. 1 the transmission 124 is releasably correctable to the rear driveshaft 131R by means of the power transfer unit (PTU) 137, allowing selectable two wheel drive or four wheel drive operation.

The PTU 137 is also operable in a 'high ratio' or a 'low ratio' configuration, in which a gear ratio between an input shaft and an output shaft thereof is selected to be a high or low ratio. The high ratio configuration is suitable for general on-road or "on-highway" operations whilst the low ratio configuration is more suitable for negotiating certain off-road terrain conditions and other low speed applications such as towing.

The vehicle 101 has a central controller 1010, referred to as a vehicle control unit (VCU) 101C. The VCU 101C receives and outputs a plurality of signals to and from various sensors and subsystems provided on the vehicle 101.

The vehicle 101 has a transmission mode selector dial 124S operable to select a required operating mode of the transmission 124. The selector dial 124S provides a control signal to a transmission controller 124C which in turn controls the transmission 124 to operate according to the selected mode. Available modes include a park mode, a reverse mode and a drive mode.

The vehicle 101 also has a terrain response mode selector dial 128S. The terrain response mode selector dial 128S is operable by a driver to select a required terrain response mode of operation of the vehicle.

It is to be understood that if a user selects the drive mode of the transmission 124, the engine controller 1210 employs a drive mode throttle map to determine the amount of drive torque, that the engine 121 should produce as a function of accelerator pedal position, if the user selects the sport mode of the transmission, the engine controller 1210 employs a sport mode throttle map instead of the drive mode throttle map. The throttle maps differ in that the sport, mode throttle map is arranged to provide a more aggressive response by the engine 121C to a given initial advance (such as depression) of the accelerator pedal 181. Different respective driveability filters may also be applied in dependence on the selected transmission mode.

Different accelerator pedal position/output torque maps (and driveability filters) are also employed for different respective user-selectable terrain response modes.

As noted above, in some arrangements the vehicle may be operable automatically to select an appropriate TR mode for the prevailing driving conditions.

FIG. 2 shows two different accelerator pedal progression maps in the form of a plot of engine torque output T as a function of accelerator pedal position P on a scale from 0 to 100% of full scale depression of the accelerator pedal 161.

FIG. 2 shows two extreme vehicle operating modes A,B. Mode A is a cautious torque map and may correspond for example to a TR mode suitable for use when driving over sand. Mode B is a more aggressive torque map and may correspond to a TR mode suitable for use when driving over rock. A driver may select operation according to mode A or mode B by means of the TR mode selector dial 128S. At the zero and 100% accelerator positions, the torque maps coincide, but at part depression of the accelerator pedal 161 significant differences in torque output are apparent.

Thus a switch from mode A to mode S at point C (50% application of accelerator pedal) results in an immediate jump to point D, with consequent increase in engine torque output. The characteristic of line 8 is subsequently followed. A corresponding switch in the reverse direction results in significant drop in output torque. Changes between torque maps generally comprise movements in the direction of the y axis.

The change in output torque of the engine may take time, and can be deliberately blended, as illustrated in FIG. 8. FIG. 3 is a plot of output torque as a function of time during blending from mode A to mode B at point C. Thus the increase from point C to point D may be controlled to avoid a step change. For example a maximum blending rate, say 7 Nm/s may be applied, and/or blending may take place at a defined rate within a maximum time period, of say 20 seconds. A small torque change will blend quickly, and a large torque change will take longer.

During a long period of blending from one torque characteristic to another, the vehicle driver may wish to move the accelerator pedal 181 to demand more or less torque from the vehicle engine 121. It would be desirable to minimize the changeover time commensurate with the changing demands of the vehicle driver.

It is against this background that the present invention has been conceived. Aspects and embodiments of the invention may provide a system, a method and a vehicle in which blending is improved. Other aims and advantages of aspects and embodiments of the present invention will become apparent from the following description, claims and drawings.

SUMMARY OF THE INVENTION

According to a first aspect of the invention for which protection is sought there is provided a method of blending between different characteristics of accelerator pedal position and output torque in a vehicle, the method comprising the steps of:
  detecting a first operating mode of a vehicle and applying a source characteristic;
  detecting a change of operating mode of the vehicle and selecting a target characteristic;
  blending the characteristic applied from the source characteristic to the target characteristic at a base blending rate, said blending rate being increased if during blending the position of the accelerator pedal is moved in the direction of torque change due to blending.

According to a second aspect of the invention for which protection is sought there is provided a method of blending between different characteristics of accelerator position and output torque in a vehicle, the method comprising the steps of:
  defecting a first operating mode of a vehicle and applying a source characteristic;
  detecting a change of operating mode of the vehicle and selecting a target characteristic;
  blending the characteristic, applied from the source characteristic to the target characteristic at a base blending rate, said blending rate being reduced if during blending the position of the accelerator pedal is not substantially moved, or is moved in oppositely to the direction of torque change due to blending.

The characteristic relating accelerator pedal position to output torque may directly indicate the torque output at the flywheel of an internal combustion engine, or may represent an analogue thereof, such as one or more of drive torque at the vehicle wheels, power output, another measure of tractive effort fuel flow, airflow or any measurable indicator that varies accordingly to accelerator pedal progression and torque output. The output torque may represent the output of other forms of motive power, such as an electric motor, or an analogue thereof, such as motor current. Where the vehicle is a hybrid vehicle in which more than one source of propulsion may operate in parallel, output torque may correspond to a net torque, delivered to a powertrain by an engine and one or more electric propulsion motors.

Many suitable analogues are known, so that whilst output torque is a convenient direct measure, the Invention does not exclude the use of one or more analogues to define the changing pedal progression characteristic.

Thus according to embodiments of the invention, a change in torque demand, due to a change of vehicle operating mode, to a target characteristic, will be completed comparatively quickly if during the transition the vehicle driver re-positions the accelerator pedal in the direction of the changing torque demand.

Embodiments of the invention reflect that a vehicle driver will be less disconcerted by a changing torque output due to mode change, if the intention of the driver is in the direction of changing torque output.

In the first aspect of the Invention described above, the base blending rate may be zero or positive, and the increased rate will be a greater value. In the second aspect of the invention described above, the base blending rate will be positive, and the reduced rate will be a lesser rate, or zero.

Embodiments of the present invention can be implemented in several ways. In one method a base blending rate is applied when a change in output torque due to a mode change is required, and driver torque demand changes in the direction of the change of torque. A reduced blending rate is applied for a substantially unchanging driver demand and for changes in driver torque demand that occur in the opposite direction to the blend.

In an alternative a base blending rate is applied when a change in output torque due to a mode, change takes place accompanied by substantially unchanging driver demand or by a driver demand opposite to the direction of the change in torque. An increased blending rate is applied for driver demand in the direction of the change.

In another alternative a standard blending rate may be determined, and increased and/or reduced rates of blending applied according to the direction of driver demand in relation to the change of output torque due to mode change.

A fixed base blending rate may be applied for all pedal progression (torque) characteristics, but preferably the base blending rate is selected according to the particular source and target maps. For example the base blending rate may be varied according to the difference between the source and target torque at the instant pedal position, a greater rate being applied where the difference is greater. Furthermore the base blending rate may be varied according to the position of the accelerator pedal, so that different rates may apply as the pedal moves from fully closed to fully open. These different rates may for example be retained in a look-up table by reference to torque map and accelerator pedal position.

Likewise, the changed blending rate (increased or reduced) may be discrete or defined as a percentage of the base blending rate, or be changed according to the difference between the torque maps, or according to the instant position of the accelerator pedal it is to be understood that reference to percentage is directly equivalent to reference to a proportion, in contrast with a fixed absolute value that is not a proportion of another value.

In the case of analogues of output torque, the skilled man will identify parameters to give an equivalent effect, to the intent that blending is more quickly completed if driver demand is in the direction of the change in output torque (or the selected analogue thereof).

In one embodiment of the invention, the change in blending rate due to a particular condition and instant position of the accelerator pedal is linked to the instant torque difference between the source and target torque characteristics.

Thus an increased rate of blend consequent upon driver demand in the direction of the blend may be a step change, for example a rate increase in the range 30-100%, during the period of Increased rate. Preferably however the rate increase is proportional to the instant torque difference so that a high rate is applied for a large torque difference, and this rate is gradually reduced as the torque difference reduces. The rate may vary according to the instant position of the accelerator pedal.

According to a further aspect of the invention there is provided an electronic control system of a vehicle, for blending between different characteristics of accelerator pedal position and output torque by reference to a plurality of torque maps held within a memory, said system being adapted to detect a first operating mode of the vehicle and apply a source torque man, detect a change of operating mode of the vehicle and select a target torque map, and blend the torque map applied from said source torque map to said target torque map at a base blending rate, said base blending rate being increased if the torque change due to blending is in the direction of driver demand.

Optionally, in addition or instead, the blending rate may be reduced if during blending the position of the accelerator pedal is not substantially moved, or is moved oppositely to the direction of torque change due to blending.

Furthermore, an aspect of the invention provides a vehicle having such an electronic control system and a system of automatically changing operating mode in response to different conditions of use, such as a change of terrain.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments unless such features are incompatible.

BRIEF DESCRIPTION OF THE DRAWINGS

Embodiments of the present invention will now be described, by way of example only, with reference to the accompanying drawings in which:

FIG. 2 and FIG. 3 illustrate graphically blending of torque between different operating modes of a vehicle;

FIG. 5 and FIG. 6 illustrate modified blending according to an embodiment of the present invention.

DETAILED DESCRIPTION

Figure 1:
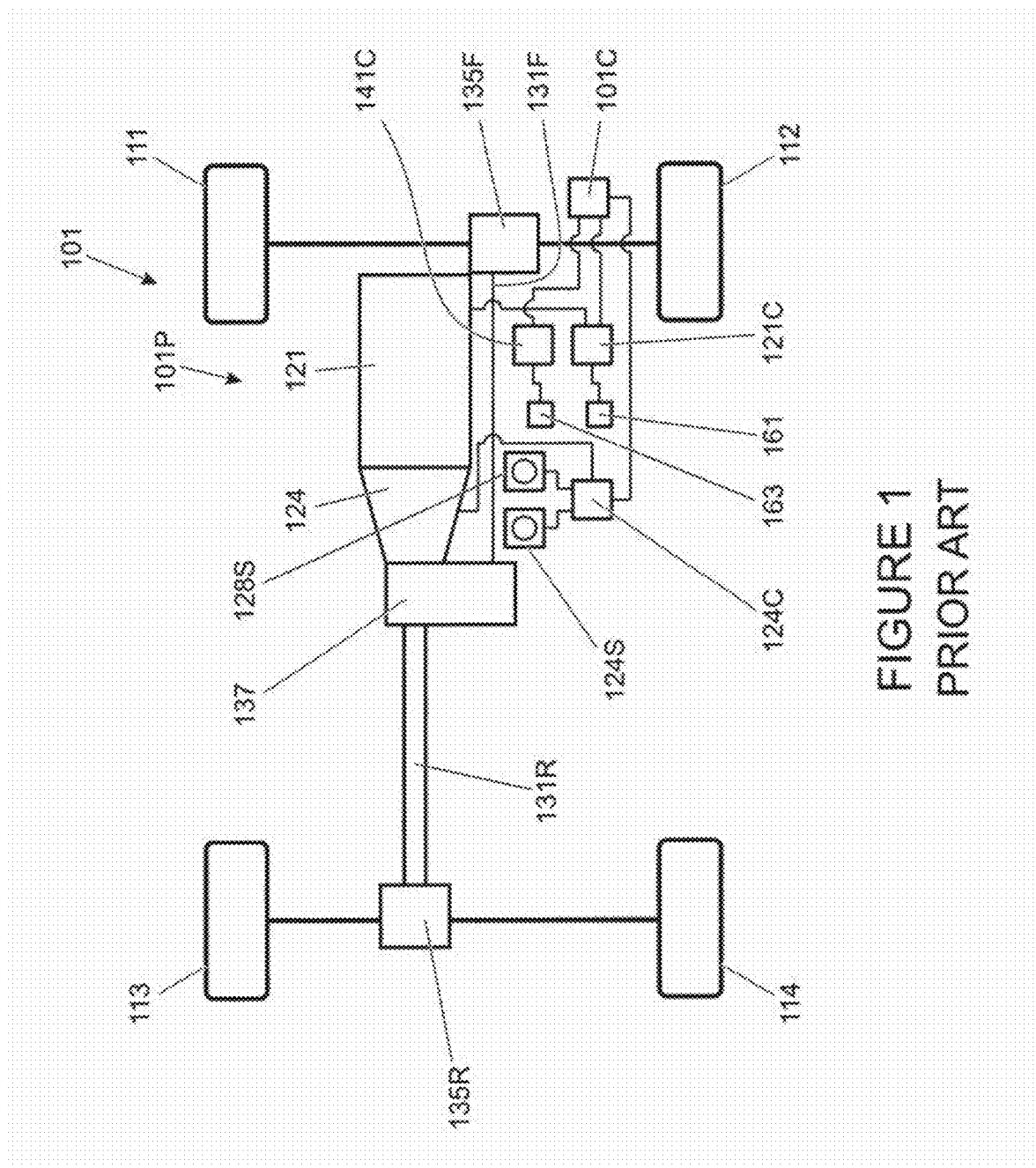
FIG. 1 is a schematic illustration of a known motor vehicle.
Figure 4:
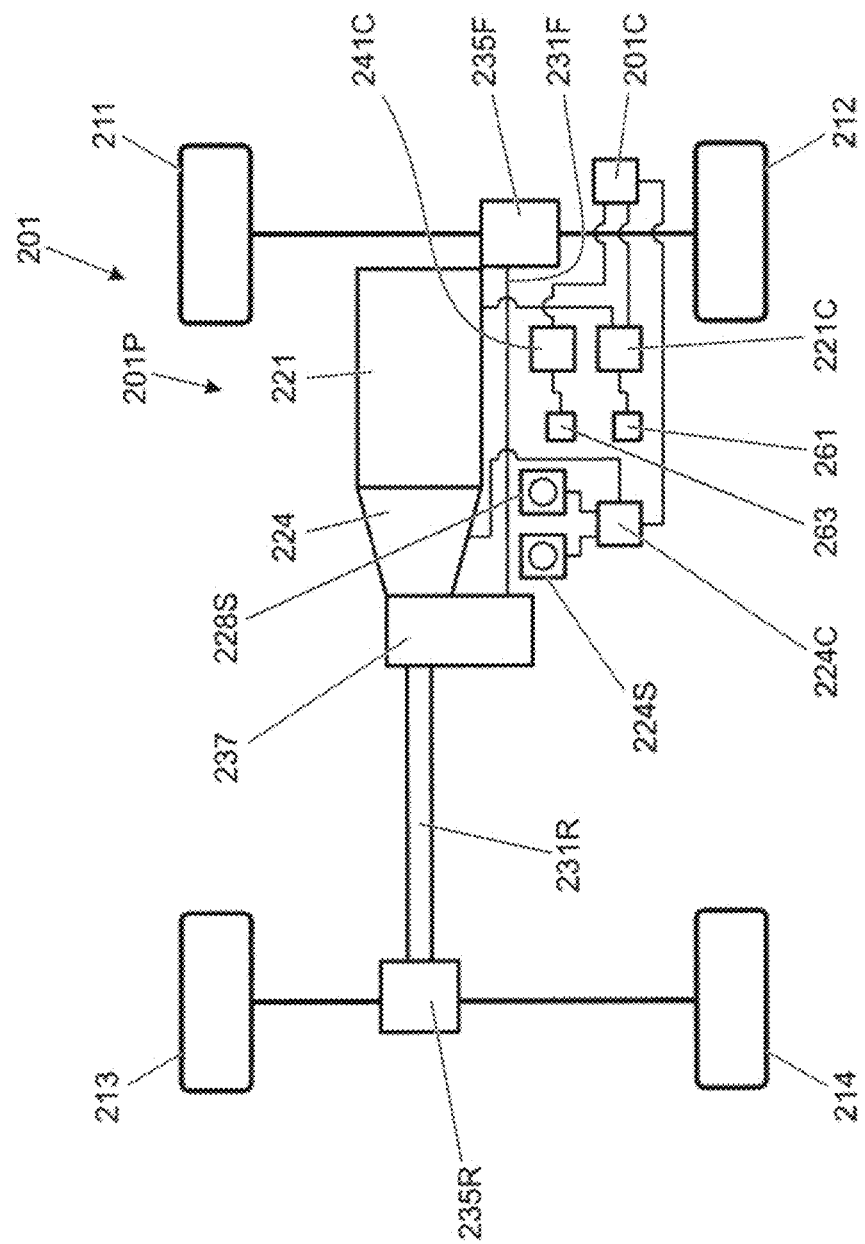
FIG. 4 is a schematic illustration of a motor vehicle according to an embodiment of the present invention.

FIG. 4 is a schematic illustration of a motor vehicle 201 according to an embodiment of the present invention. Like features of the vehicle 201 of FIG. 4 to those of the vehicle 101 of FIG. 1 are shown with like reference numerals prefixed numeral 2 instead of numeral 1. Thus engine 121 of the vehicle 101 of FIG. 1 corresponds to engine 221 of the vehicle 201 of FIG. 4.

The vehicle 201 has a VCU 201 programmed with accelerator pedal progression maps that are used to determine engine torque T as a function of accelerator pedal position P.

FIG. 5 is a plot of engine torque (T) against time (t) over a period of changing accelerator pedal position for the vehicle 201 of FIG. 4. Two vehicle modes M1, M2 are illustrated, each mode having a different output torque from the engine 221 in response to a given accelerator pedal position. Mode M1 may be characterised as cautious, corresponding to program A of FIG. 1, whereas mode M2 corresponds to program B of FIG. 1, and is more aggressive.

Accelerator pedal position is not shown, but torque increases and decreases can be assumed to follow a similar change to accelerator pedal position.

Thus at time $t_0$, the accelerator pedal 161 is not advanced (and is therefore in a substantially released position, at a substantially undepressed or neutral position) and engine torque output may be considered to be substantially zero even if the engine 221 is running at idle speed.

At $t_1$ the accelerator pedal position is advanced. Two possible torque paths are possible, following the traces M1 and M2, depending on whether mode M1 or mode M2 are selected. The vehicle is assumed to be in mode M1 so that output torque follows the trace M1.

At $t_2$, movement of the accelerator pedal 161 is paused, and in consequence there is no further rise in engine output torque.

At $t_3$, the VCU 201C automatically changes the mode of operation of the vehicle to mode M2, for example due to detection of a change of terrain by means not described here. Blending of engine output, torque T to that required for operation in mode M2 commences at a fixed base rate determined empirically as the maximum rate which a vehicle driver will accept without becoming disconcerted during an automatic mode change.

At $t_3$, the instant torque (mode M1) is about 80 Nm, and the target torque (mode M2) is about 200 Nm. The difference is thus 120 Mm, and a typical base blending rate is 7 Nm/s although other values may be used instead. If accelerator position remains unchanged, blending from M1 to M2 at the base rate will thus take about 17 seconds, in this example.

After $t_3$ the angina output torque T, shown by trace E in FIG. 5, thus begins progressively to increase above the trace of mode M1.

At $t_4$ the accelerator pedal position is retracted: engine output torque reduces in consequence, but blending at the base rate continues so that when the accelerator pedal is paused at $t_5$ a further upward divergence of trace E from trace M1 is apparent.

The accelerator pedal 181 is paused until $t_6$, and further upward divergence at the base blending rate is apparent in this period.

At $t_6$ the accelerator pedal 161 is again advanced. Since driver demand for increased torque is in the direction of blending from M1 to M2, the rate of blending is increased above the base blending rate, so that by the time the accelerator pedal is again paused at $t_7$, engine output torque T has rapidly approached M2. Thus in this example, the period from $t_5$ to $t_6$ at the base blending rate provided for about 25% of blending to be completed. The shorter period from $t_6$ to $t_7$ at the increased blending rate allowed blending to reach about 80% completion.

At $t_7$ the accelerator pedal is again paused, and blending is resumed at the base blending rate. If no further change of accelerator position is made before blending is completed, the time for blending will have reduced from about 17 seconds to about 12 seconds.

Similarly, as shown in FIG. 6, a change in vehicle mode at time $t_6$ to a more cautious engine torque map (from map M2 to map M1) causes blending at the base rate from $t_8$ to $t_9$—in this period the accelerator pedal position is not changing.

At $t_{10}$, the accelerator pedal 261 is backed-off, to demand a lower torque from the engine 221. Since this action is in the direction of mode change from M2 to M1, the base blending rate is increased, so that by when movement of the accelerator pedal 261 is paused, 50% of the blend is completed.

After $t_{10}$, blending continues at the base rate, and does so during a period of an advancing accelerator pedal position from $t_{11}$ to $t_{12}$, and at a paused position after $t_{12}$.

Special measures may be employed when the accelerator pedal is moved rapidly towards the maximum and minimum positions. In this case, in the vehicle 201 of the embodiment of FIG. 4 if the pedal 261 is advanced to a maximum position (which may be defined as greater than 95% of full travel of the accelerator pedal 261) at a rate greater than a prescribed rate, the VCU 201C is arranged to command substantially immediately the application of substantially the full amount of engine torque T corresponding to position U of FIG. 2.

In some embodiments, blending is determined by the VCU 201C to be complete substantially immediately when the accelerator pedal 281 is advanced to the maximum position (corresponding to position U) or retreated to the minimum position (which may be defined as less than 5% of the full travel of the accelerator pedal 261 and corresponds to position L). No further blending is therefore required, and further accelerator pedal movement results in engine response according to the mode trace to which blending was being performed. The prescribed rates for advancement or backing of the pedal 261 may be substantially the same or different.

In the embodiment of FIG. 4, if blending is still incomplete when the accelerator pedal 261 is advanced to the maximum position or backed to the minimum position, the VCU 201C may be configured to apply maximum or minimum available torque respectively, but blending may continue at a prescribed rate (such as the base blending rate) whilst the pedal is at the maximum or minimum positions. If however the pedal is subsequently moved away from the maximum or minimum positions, before blending is complete, the blending rate may be increased if the pedal is moved in the direction of blending, as described above.

It will be appreciated that definition and recognition of the minimum and maximum accelerator positions may be selected according to the nature and precision of the accelerator pedal mechanism, and in particular to the accuracy, noise and hysteresis present in the output of a potentiometer indicative of pedal position. Selection and adjustment of these parameters is within the ability of an appropriately skied person.

Likewise, the rate of change of accelerator pedal position may be sensed in some embodiments in order to determine whether movement to the maximum and minimum positions is in progress, and thereby give an early indication that engine output torque should be maximized or minimized substantially immediately.

In the present embodiment illustrated in FIG. 4, a method of blending is implemented whereby the blending rate is increased when driver demand is in the direction of blend. The same effect may be realized in a method where blending rate is reduced, typically to zero, when driver demand is unchanging or opposite to the direction of blend.

These two methods may be combined so that a base blending rate is applied for a substantially constant position of accelerator pedal, is increased when driver demand is in the direction of blend, and is reduced when driver demand is opposite to the direction of blend.

FIGS. 7 to 10 illustrate the effect of one embodiment of the invention in which the rate of blending is increased when driver intention is to change the amount of engine torque in the direction of the blend.

Figure 7:
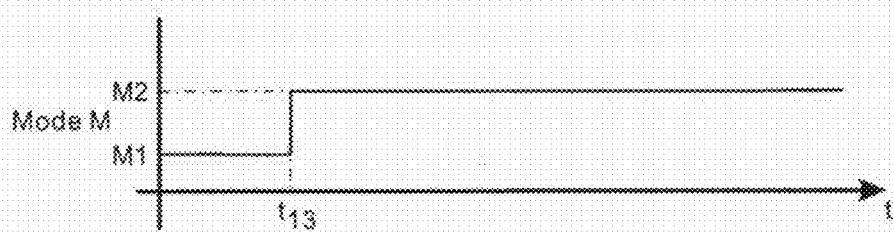
FIGS. 7 to 11 illustrate the effect of embodiments of the invention for a method of increased blending rate with corresponding change of driver intention.

FIG. 7 is a plot of vehicle mode as a function of time. The plot indicates a change of mode from M1 to M2 at time $t_{13}$. Mode M2 corresponds to trace B of FIG. 2 and is a more aggressive torque mapping than mode M1, which corresponds to trace A of FIG. 2.

Figure 8:
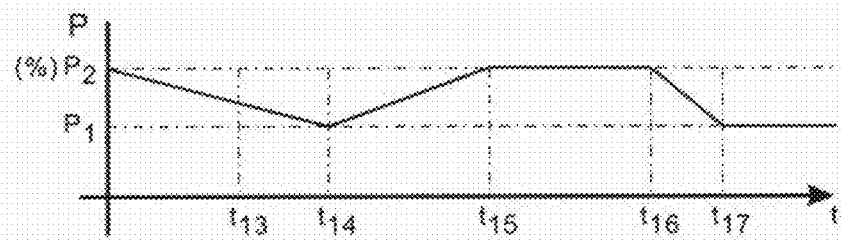

FIG. 8 is a plot of accelerator pedal position as a function of time between two exemplar positions or levels P1, P2 between 0 and 100% of full travel of the accelerator pedal 261. At time $t_{14}$ a backing accelerator is advanced, and at $t_{15}$ a steady condition is assumed. At $t_{16}$ backing is again initiated until a steady state is reached at $t_{17}$.

Figure 9:
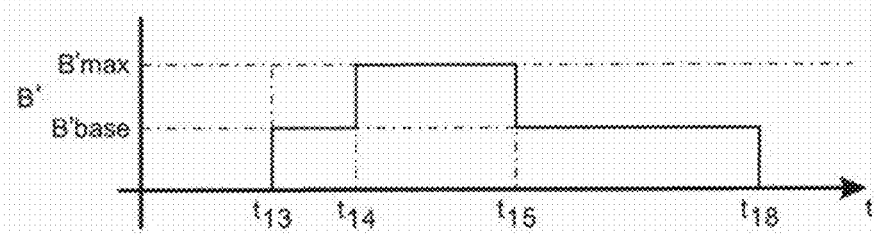

FIG. 9 is a plot of blending rate B' as a function of time. If can be seen that at the moment the mode change is initiated, a base blending rate B'base is applied. B'base is substantially equal to half the maximum available blending rate B'max that may be applied in the present embodiment although other proportions or other absolute values are also useful. The base blending rate is applied between time $t_{13}$ and time $t_{14}$ whilst the accelerator pedal 261 is not advancing.

Between times $t_{14}$ and $t_{15}$, the maximum blending rate B'max is applied, whilst the accelerator pedal position is advancing. During the period from $t_{15}$ to $t_{16}$ the accelerator pedal is substantially stationary whilst during the period from $t_{15}$ to $t_{17}$ the accelerator pedal 261 is backed (moved towards a less depressed position). From time $t_{17}$ the accelerator pedal 261 remains substantially stationary. Accordingly, the VCU 201C reduces the blending rate from B'max to B'base during the period from in onwards, until blending is complete at time $t_{18}$ as described below.

Figure 10:
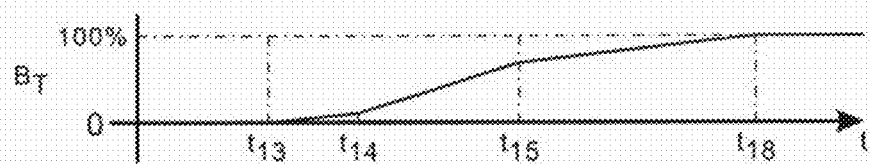

FIG. 10 is a plot of percent completion of blending $B_T$ as a function of time, it can fee seen that the rate of blending increases significantly between times $t_{14}$ and $t_{15}$ compared with the base rate before and after this period, which reduces the overall time for completion of blending from M1 to M2. Blending can be seen to be complete at time $t_{18}$.

Figure 11:
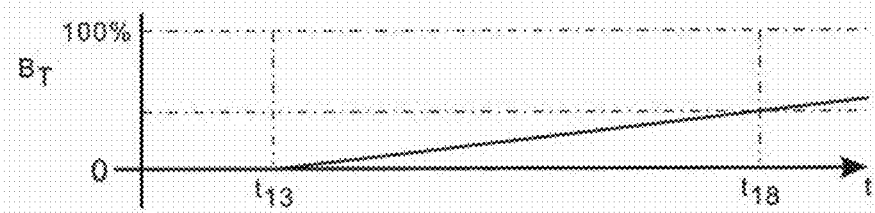

FIG. 11 is a plot of percent completion of blending $B_T$ for an embodiment in which the blending rate B' remains substantially equal to a base blending B'base throughout the period during which blending takes place. It can be seen that the time required to complete blending between modes M1 and M2 is much longer than that in the case of the embodiment described with respect to FIGS. 7 to 10, having the blending rate profile of FIG. 9. In the embodiment illustrated in FIG. 11, the base blending rate B'base is initiated at $t_{13}$, so that the engine torque mapping gradually changes to meet M2. At time t18 blending is still incomplete as can be seen from FIG. 11.

Embodiments of the present invention have the advantage that blending can be completed more quickly than in some alternative systems. This is at least in part because the blending rate may be varied according to movement of the accelerator pedal by the driver. In some embodiments, if the accelerator pedal 261 is moved in the direction of torque change due to the mode change, the blending rata may be increased. Alternatively or in addition if the accelerator pedal 261 is held stationary or moved in a direction against the direction of torque, change due to the mode change, the blending rate may be reduced, optionally substantially to zero.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspects embodiment or example described herein unless incompatible therewith.

The invention claimed is:

1. A method of blending between different characteristics of accelerator position and output torque in a vehicle, the method comprising:
   detecting a first operating mode of a vehicle and applying an associated source characteristic;
   changing to a second operating mode of the vehicle, wherein said change is automatically made in response to the vehicle sensing a change of operating condition, and selecting a target characteristic associated with the second operating mode;
   blending, by an electronic control system of the vehicle, the characteristic applied from the first operating mode source characteristic to the second operating mode target characteristic at a base blending rate, said blending rate being increased during blending when the position of the accelerator pedal is moved in the direction of torque change due to blending.

2. A method of blending between different characteristics of accelerator position and output torque in a vehicle, the method comprising:
   detecting a first operating mode of a vehicle and applying an associated source characteristic;
   changing to a second operating mode of the vehicle, wherein said change is automatically made in response to the vehicle sensing a change of operating condition, and selecting a target characteristic associated with the second operating mode;
   blending, by an electronic control system of the vehicle, the characteristic applied from the first operating mode source characteristic to the second operating mode target characteristic at a base blending rate, said blending rate being reduced during blending when the position of the accelerator pedal is not substantially moved, or is moved oppositely to the direction of torque change due to blending.

3. A method according to claim 1, wherein the base blending rate is non-zero.

4. A method according to claim 1, and including the further step of re-adopting said base blending rate if the position of the accelerator pedal is not changed or is moving oppositely to the direction of torque change.

5. A method according to claim 2, and including the further step of re-adopting said base blending rate if the position of the accelerator pedal is moved in the direction of torque change.

6. A method according to claim 1, wherein said base blending rate is variable according to the difference between a source characteristic and a target characteristic.

7. A method according to claim 1, wherein the increase in said blending rate is variable according to the difference between a source characteristic and a target characteristic.

8. A method according to any of claim 2, wherein the reduction in said blending rate is variable according to the difference between a source characteristic and a target characteristic.

9. A method according to claim 1, wherein said base blending rate is increased by a percentage thereof.

10. A method according to claim 1, wherein the amount by which the base blending rate is increased dependent upon the instant position of said accelerator pedal.

11. An electronic control system of a vehicle, for blending between different characteristics of accelerator pedal position and output torque by reference to a plurality of torque maps held within a memory, said system being adapted to detect a first operating mode of the vehicle and apply an associated source torque map, change the operating mode of the vehicle to a second operating mode, wherein said change is automatically made in response to the vehicle sensing a change of operating condition, and select a target torque map associated with the second operating mode, and blend the torque map applied from the first operating mode source torque map to the second operating mode target torque map at a base blending rate, said base blending rate being increased during blending when the torque change due to blending is in the direction of driver demand.

12. An electronic control system of a vehicle, for blending between different characteristics of accelerator pedal position and output torque by reference to a plurality of torque maps held within a memory, said system being adapted to detect a first operating mode of the vehicle and apply an associated source torque map, change the operating mode of the vehicle to a second operating mode, wherein said change is automatically made in response to the vehicle sensing a change of operating condition, and select a target torque map associated with the second operating mode, and blend the torque map applied from the first operating mode source torque map to the second operating mode target torque map at a base blending rate, said base blending rate being reduced during blending when the torque change due to blending is not in the direction of driver demand.

13. A system according to claim 11, wherein said base blending rate is determined according to the difference between said source map and said target map.

14. A system according to claim 12, wherein said base blending rate is determined according to the instant position of the accelerator pedal.

15. A vehicle having a control system according to claim 11, and a system for automatically changing operating mode of a vehicle according to different conditions of use, whereby one of a plurality of torque maps is selected for each operating mode.

16. A vehicle having a control system according to claim 12, and a system for automatically changing operating mode of a vehicle according to different conditions of use, whereby one of a plurality of torque maps is selected for each operating mode.

17. A method according to claim 2, wherein said base blending rate is reduced by a percentage thereof.

18. A method according to claim 2, wherein the amount by which the base blending rate is reduced dependent upon the instant position of said accelerator pedal.

19. A method according to claim 2, further comprising the step of operating the vehicle using the blended characteristic.

20. A method according to claim 1, further comprising the step of operating the vehicle using the blended characteristic.

21. A method according to claim 1, comprising detecting a change to the second operating mode.

22. A method according to claim 1, comprising detecting a change to the second operating mode.

23. A system according to claim 11, the system being adapted to detect a change to the second operating mode.

24. A system according to claim 12, the system being adapted to detect a change to the second operating mode.

* * * * *